(12) United States Patent
Schmidlkofer

(10) Patent No.: US 8,281,969 B2
(45) Date of Patent: Oct. 9, 2012

(54) EQUIPMENT RACK FOR TRAILERS

(76) Inventor: David L. Schmidlkofer, Sequim, WA (US)

( * ) Notice: Subject to any disclaimer, the term of this patent is extended or adjusted under 35 U.S.C. 154(b) by 1290 days.

(21) Appl. No.: 12/022,031

(22) Filed: Jan. 29, 2008

(65) Prior Publication Data

US 2008/0179363 A1 Jul. 31, 2008

Related U.S. Application Data

(60) Provisional application No. 60/887,313, filed on Jan. 30, 2007.

(51) Int. Cl.
*B60R 9/00* (2006.01)
(52) U.S. Cl. ........................ 224/543; 224/42.11; 224/539
(58) Field of Classification Search .................. 224/309, 224/315, 325, 326, 539, 543, 42.11, 42.32, 224/42.33, 42.4; 280/769
See application file for complete search history.

(56) References Cited

U.S. PATENT DOCUMENTS

| | | | | |
|---|---|---|---|---|
| 1,568,895 A | * | 1/1926 | Lyons | 296/173 |
| 1,804,868 A | * | 5/1931 | Gage | 224/42.32 |
| 3,181,755 A | * | 5/1965 | Lingley | 224/494 |
| 3,726,256 A | * | 4/1973 | Bernhardt et al. | 280/30 |
| 3,765,713 A | * | 10/1973 | Suitt | 296/3 |
| 4,035,015 A | * | 7/1977 | Smith | 296/183.1 |
| 4,057,281 A | * | 11/1977 | Garrett | 296/3 |
| 4,211,448 A | * | 7/1980 | Weston | 296/3 |
| 4,261,614 A | | 4/1981 | Rice | |
| 4,310,195 A | * | 1/1982 | Huff | 296/173 |
| 4,350,471 A | | 9/1982 | Lehmann | |
| 4,405,170 A | * | 9/1983 | Raya | 296/10 |
| 4,509,787 A | * | 4/1985 | Knaack et al. | 296/3 |
| 4,887,750 A | | 12/1989 | Dainty | |
| 4,958,594 A | * | 9/1990 | Swagerty | 296/24.31 |
| 5,350,095 A | | 9/1994 | Stevens | |
| 5,398,778 A | | 3/1995 | Sexton | |
| 5,544,796 A | | 8/1996 | Dubach | |
| 5,647,489 A | * | 7/1997 | Bellis, Jr. | 224/403 |
| 6,092,972 A | | 7/2000 | Levi | |
| 6,105,840 A | | 8/2000 | Trevino | |
| 6,315,181 B1 | | 11/2001 | Bradley | |
| 6,386,410 B1 | | 5/2002 | VanDusen | |
| 6,397,644 B1 | | 6/2002 | Gidding | |
| 6,427,889 B1 | | 8/2002 | Levi | |
| 6,516,986 B1 | | 2/2003 | Lassanske | |
| 6,523,730 B2 | | 2/2003 | Anderson | |
| 6,662,983 B2 | | 12/2003 | Lane | |
| 6,688,428 B2 | | 2/2004 | Carroll, Jr. | |
| 6,715,652 B2 | | 4/2004 | Kmita et al. | |
| 6,733,219 B1 | * | 5/2004 | Floe | 296/57.1 |
| 6,755,332 B2 | * | 6/2004 | Crane et al. | 224/321 |
| 6,854,627 B2 | | 2/2005 | Villarreal et al. | |

(Continued)

*Primary Examiner* — Gary Elkins
(74) *Attorney, Agent, or Firm* — Richard T. Black; Foster Pepper

(57) ABSTRACT

Trailer racks, and more particularly to straddle-type trailer racks for closed trailers, which racks include a load platform supported by legs mounted directly to the trailer sub-frame, fit within the foot-print of the trailer wheels, do not interfere with side and rear doors, and are spaced from and not supported on the trailer body top nor rely on it for structural rigidity. The inventive straddle-type trailer rack can also be adapted for use with open trailers. A wide range of options are available, including equipment brackets secured to the legs that can also be used as steps, lockable keeper assemblies, dual function lockable safety cross braces, catwalk for the load platform, access ladder, and forward extensions. The inventive rack is also configurable in kit form.

20 Claims, 8 Drawing Sheets

U.S. PATENT DOCUMENTS

| | | | |
|---|---|---|---|
| 6,923,475 B1 * | 8/2005 | Martin et al. | 280/789 |
| 7,014,238 B2 * | 3/2006 | Gonzalez | 296/26.05 |
| 7,172,231 B1 * | 2/2007 | Johnson, II | 296/22 |
| 2003/0201288 A1 * | 10/2003 | Ford et al. | 224/310 |
| 2006/0097508 A1 * | 5/2006 | Bachman et al. | 280/837 |
| 2006/0197308 A1 * | 9/2006 | Shmueli | 280/400 |

* cited by examiner

EQUIPMENT RACK FOR TRAILERS

CROSS-REFERENCE TO RELATED APPLICATION

This is the Regular U.S. Application of Provisional Application Ser. No. 60/887,313 filed Jan. 30, 2007 by the same inventor under the same title. The benefit of the filing date of that application is claimed under 35 USC §119 and 120 ff.

FIELD

The invention relates to trailer racks, and more particularly to straddle-type trailer racks for closed trailers, which racks are mounted directly to the trailer sub-frame, fit within the foot-print of the trailer wheels, do not interfere with side and rear doors, and are not supported on the trailer body top or rely on it for structural rigidity. The inventive straddle-type trailer rack can also be adapted for use with open trailers.

BACKGROUND

Racks of various designs are commercially available for mounting on pick-up trucks and passenger-type automotive vehicles. The pick-up truck racks are mounted on the top surface of the pick-up bed side walls by means of plates that bolt through the sheet metal of the top rail. Some types include a flat plate that runs the fore-aft length of the bed rail.

Automotive racks may be mounted to the drip rails, or directly to the top sheet metal of the vehicle. They may be after-market, or part of the vehicle design as made by the automaker. Racks of this type are mounted on cars, vans, SUVs and work vans. They are used for carrying suitcases, skis, surfboards, mattresses, ladders and the like. In the case of work vans, Stevens U.S. Pat. No. 5,350,095 is directed to a side mount carrier for a work van that includes an outrigger bracket the bolts to the underframe of the vehicle. This assembly extends into the roadside, and effectively makes the vehicle several feet wider. Dainty U.S. Pat. No. 4,887,750 provides a framework that extends over the top of a vehicle with mounts that bolt through the side walls of the vehicle. The side rails act as guides for a special carrier frame on which a ladder to be carried is secured and then slid up and over onto the top of the vehicle.

Workmen, particularly in the construction trades, typically have over $10,000 worth of equipment that they take to the job sites. Since there is a lot of theft from job sites and these tradesmen often must travel to and from many different sites in a relatively short period of time, ranging from daily to monthly, they store their tools in lockable, closed "box" job trailers. One such type is called a "Wells Cargo-type" trailer. A typical 2-axle trailer has a box enclosure 14' long by 6' wide by 6' tall, with double doors in the rear. Optionally there is a side door. The doors are lockable with pad-locks. A workman will have all his power tools, supplies, generator, work lights, vices, saw horses, radio, microwave, change of clothing, special weather gear, and the like, stored therein. The trailers may be left on site overnight, and wheel locks are used to secure the trailers from roll-away theft.

However, where the workman needs ladders, long sections of tubing, corrugated drain pipes, hoses, 4'×8' sheet goods, walk-boards, large tarps, and the like, those are generally carried on the workman's truck that is used to tow the loaded trailer, typically a full sized pick-up. The ladders are typically step ladders and extension type ladders having two or more sections of length from 6-20' in length. Once on the job, the ladders are secured at night to the framing of the building under construction by cables or chains and locks. However that does not prevent theft of the ladders, which is accomplished simply by sawing through the framing member, such as a 2×4.

There is an unmet need in the art for a rack for job trailers that permits the workman to carry all his gear, including ladders, sheet goods, piping, lumber and the like, and which permits locking such items for security.

THE INVENTION

Summary, Including Objects and Advantages

The invention comprises straddle-type trailer racks for closed box or open top trailers that are mounted directly to the trailer under-frame to fit within the footprint of the trailer wheel width, do not interfere with side and rear door opening, and are not supported on the trailer body top or rely on it for structural rigidity. The inventive straddle-type trailer rack can also be adapted for use with open trailers, that is, with trailers having a planar bed with low low-rise side walls or no side walls at all. Generically, these are termed open top trailers regardless of how high are the side walls of the trailer load box or platform.

The inventive straddle-type trailer rack comprises: a) a longitudinally elongated load platform having upraised side rails and spaced transverse cross-members, and b) a plurality of vertical support legs mountable to the under frame (chassis) of the trailer by means of stand-off brackets. The cross-members are spaced, typically from 2-4' apart for structural strength and to support planar materials carried on the load platform. Some box trailers include skylights or vents in the roof. For those applications, the cross-members are spaced sufficiently above the vents to permit opening, or sufficiently far apart to permit, without interference, the opening of skylights/vents.

Vertical legs are provided to support the load platform, preferably from 2 to 4 or more spaced apart along each side (depending on trailer length and trailer duty, e.g. light vs heavy duty). For an exemplary 14' box trailer three may be provided spaced apart along the sides of the trailer. The vertical legs also include material support and step brackets to which ladders, structural materials and the like are lockably secured. These brackets also provide steps for the workman to access the top platform for securing equipment and materials to the top by lashing to the side rails and cross members. Examples of materials and equipment include plywood, sheet rock, insulation, chip-board, piping, lumber, tarps, ladders, hoses, etc.

The legs are preferably set back from the outside corners along the sides of the trailer. The legs are secured to and rest on angle brackets secured by bolts or welding directly to the steel under-frame of the trailer. As mounted on the brackets, the legs clear the sides and support the work platform in a position raised above the trailer box top. Thus, the inventive rack truly straddles the trailer box so that it does not put weight on the box roof. Although the box structure is strong as an enclosure, it is not designed, constructed or intended to be load-bearing. Thus, the inventive rack is spaced away from the side walls and top by from about 1 to about 6 inches or more. Since the load in the trailer can cause the box superstructure to sway during travel, spacer brackets are preferably provided between the leg and the side wall adjacent the top edge of the side walls.

The legs are also located spaced forward of the rear doors and rearward of the forward wall so as to not interfere with door opening, front and rear. (Some trailers have a door in the front wall.) In addition, the legs do not extend outwardly beyond the track of the wheels. The center leg of the 6-leg (3 per side) straddle-type trailer rack of the invention is mounted on top of the fender, and is supported by a bracket secured to the frame under the fender and just below the leg.

The length of the legs can be selected to suit a particular trade and towing vehicle. On a typical 14' trailer, the load platform is high enough that long objects carried on it can be placed to project forward, and are high enough to clear the bed of the towing pick-up. Indeed, for the embodiment having an extension forward of the trailer front wall, the carried object can clear the cab of the towing pick-up or SUV. Thus, 30' long irrigation pipe could be carried by a 16' trailer having the extended rack of this invention (a slider plate may be provided for the cab roof).

Optionally, the rack load platform may include a catwalk down the center or one or both sides, and a ladder that is secured to a forward (or rear) cross member and extends down the forward (or rear) side in use. The ladder may be fixed or hooked to the cross member, may be a stow-away type, pivoted at the top to fold down, or may be mounted on slides under the load platform deck to slide out, then pivot down. Optionally, a ladder may be provided on one or more sides, or a stow-away type ladder provided in the back offset to one side so that at least one door can open when the ladder is down.

The rack work platform may include additional diagonal cross braces connecting the cross-members for additional reinforcement where needed. Optionally, a fixed or dismountable reinforcing horizontal cross brace may be provided to span transversely between the front or/and rear side legs. These cross braces are generally U-shaped in plan view so that they extend forward of the front face of the trailer, or aft of the rear face to connect to the corresponding front or rear vertical side legs. These cross braces can bolt to a bracket projecting forward of the front legs across the front wall of the trailer. For the rear cross brace, the cross brace itself has projecting flanges, one at each end extending orthogonal to the axis of the brace, that fits into a receiver-type sleeve welded to the inner face of the rear leg, each side, or may hook over a notched bracket secured to the leg. The rear cross brace provides additional security against damage or theft via the rear doors.

The inventive straddle-type trailer racks can be mounted to open trailers. In that configuration, the inventive rack provides a framework to which siding material, such as plywood or canvas can be attached as a weather covering for the trailer load during travel. Lashing hooks or eyes can be provided to the legs and cross members. Reinforcing cross bracing between legs made of tubing or guy wires can be used on the front and sides of the rack assembly.

The load platform vertical side rails may be provided in a wide range of configurations and sizes to suit a particular trade, and may include tie-down rings or hooks spaced as needed. Front or/and rear transverse end rails may also be provided, so the load platform forms a relatively shallow (6-12" deep) tray. In one embodiment, the side rails extend forward of the front of the trailer and are supported by two legs that are secured to a support plate spanning across the exposed frame just aft of the hitch. This extension assembly permits carrying longer material loads without excess overhang at the back. Thus a 20' beam, pipe or ladder can be carried on a 14' trailer with no more than a 2' rear overhang.

The inventive straddle-type trailer rack may be provided in a kit form in which the vertical legs bolt to the load platform by fitting into sleeves welded to the bottom of the load platform. The legs and sleeves have aligned holes for bolt-together assembly. Optionally the legs can be welded into the sleeves. In an even smaller kit package, the cross pieces can likewise fit in sleeves provided on the inner faces of the side rails, and bolt together through aligned holes. The leg support brackets are the same as in the pre-assembled model. Alternately, the brackets can include short sleeves of piping having an ID that receives the OD of the legs, and aligned holes are provided in each to permit bolt-together assembly.

The inventive straddle-type trailer rack provides the workmen additional, single-vehicle carrying capacity, with lock-in-place security features so that ladders can be mounted on their own trailer for better and secure tools and equipment management.

BRIEF DESCRIPTION OF THE DRAWINGS

The invention is described in detail by reference to the attached line drawings, in which.

DETAILED DESCRIPTION OF THE INVENTION, INCLUDING THE BEST MODE

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the photographs or drawings show in schematic, or omit, parts that are not essential in that drawing to a description of a particular feature, aspect or principle of the invention being disclosed. Thus, the best mode embodiment of one feature may be shown in one photo/drawing, and the best mode of another feature will be called out in another photo/drawing.

All publications, patents and applications cited in this specification are herein incorporated by reference as if each individual publication, patent or application had been expressly stated to be incorporated by reference.

The line drawings of the Figures are numbered so that one skilled in the art of rack construction and use, by reference to the attached parts list will easily be able to understand the materials and method of construction and will be able to easily assemble the parts to achieve the functionality shown.

Figure 1:
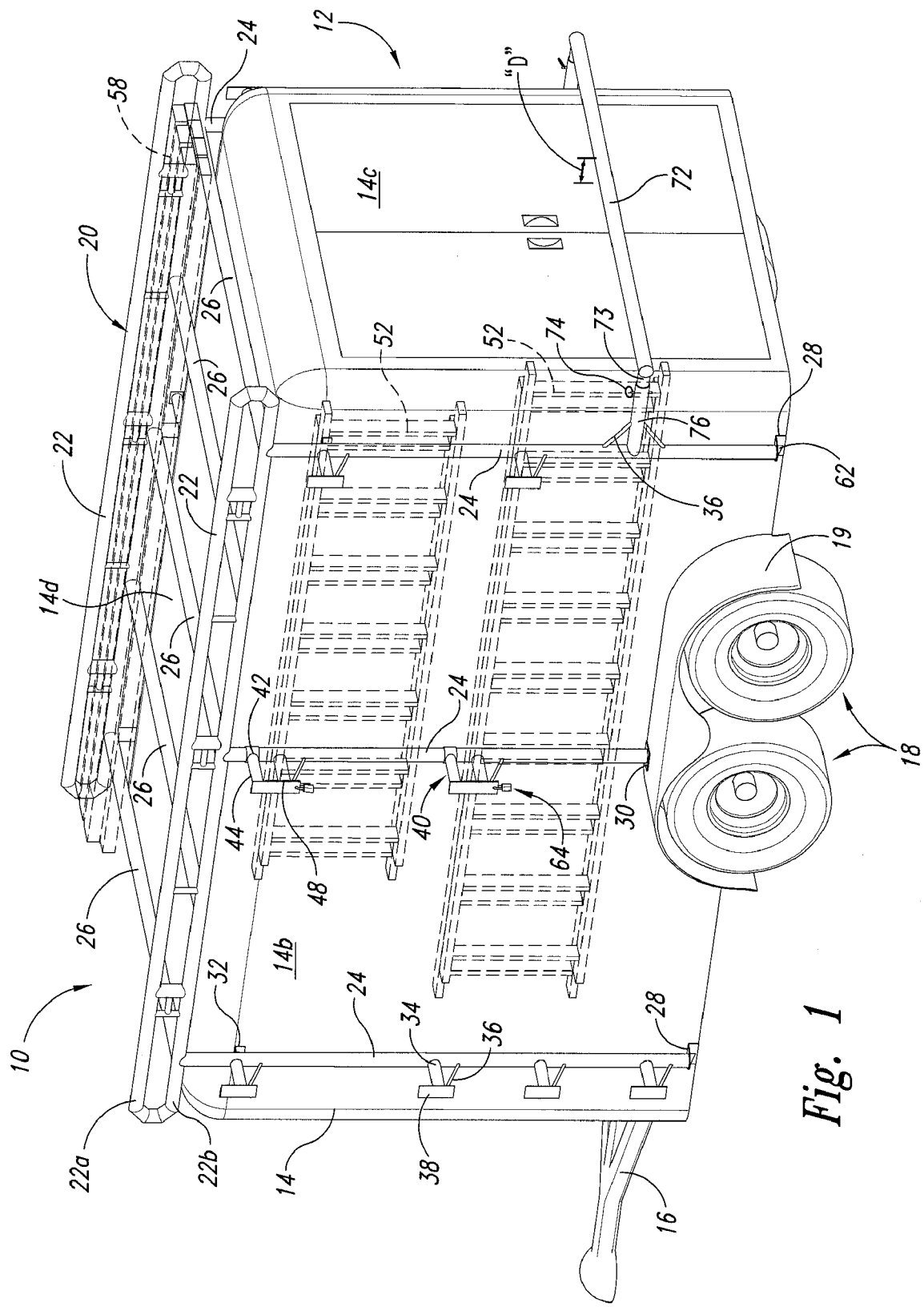
FIG. 1 is a perspective view from the left rear side of the inventive trailer rack, mounted on a 2-axle, closed box trailer of the type that has a pair of rear doors.
Figure 2:
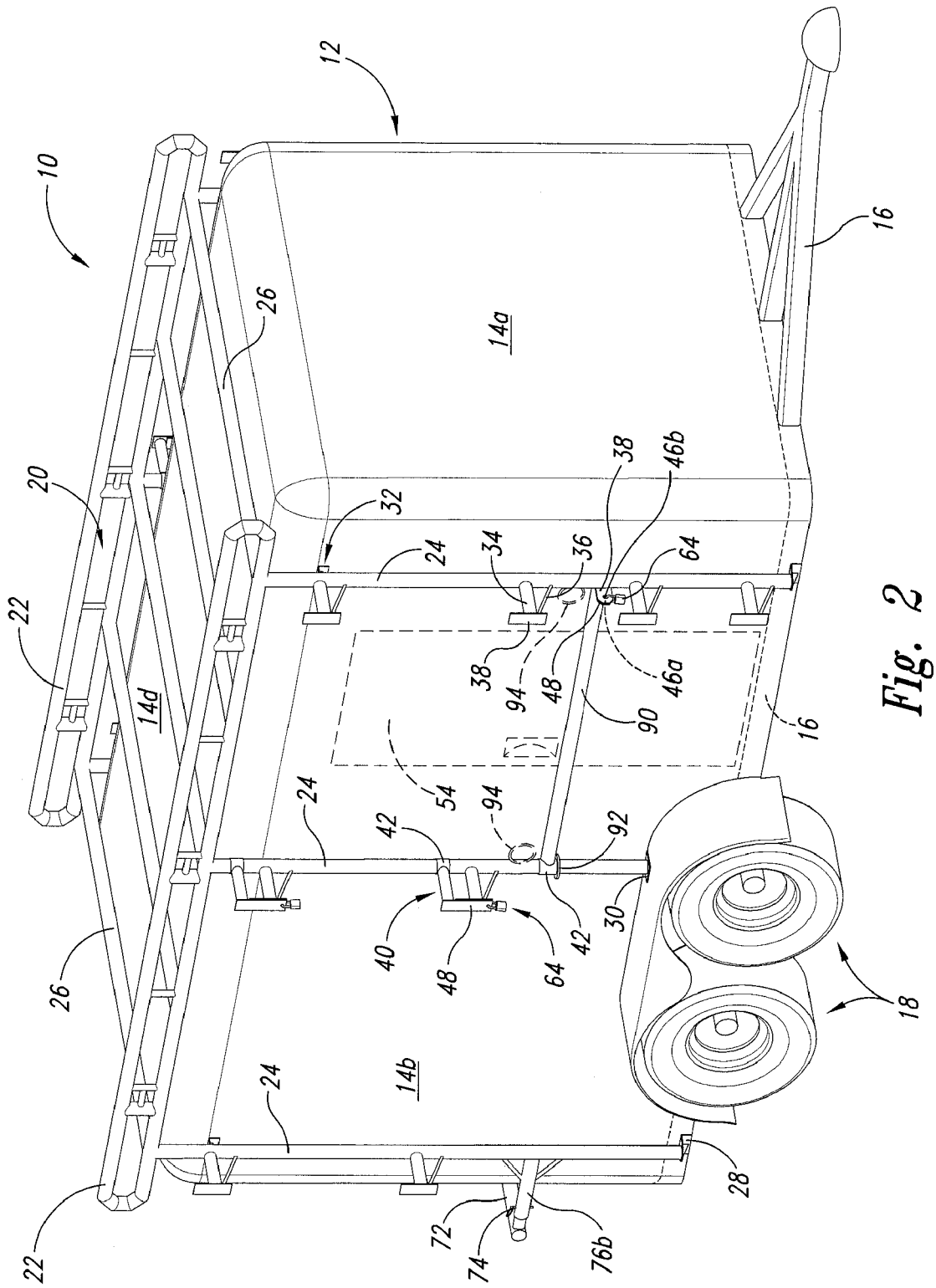
FIG. 2 is a perspective view of the trailer of FIG. 1 from the right front side of the trailer, illustrating the inventive rack legs and frame mounting brackets, as well as lockable ladder and step brackets, and showing an optional side door in the trailer box.
Figure 3:
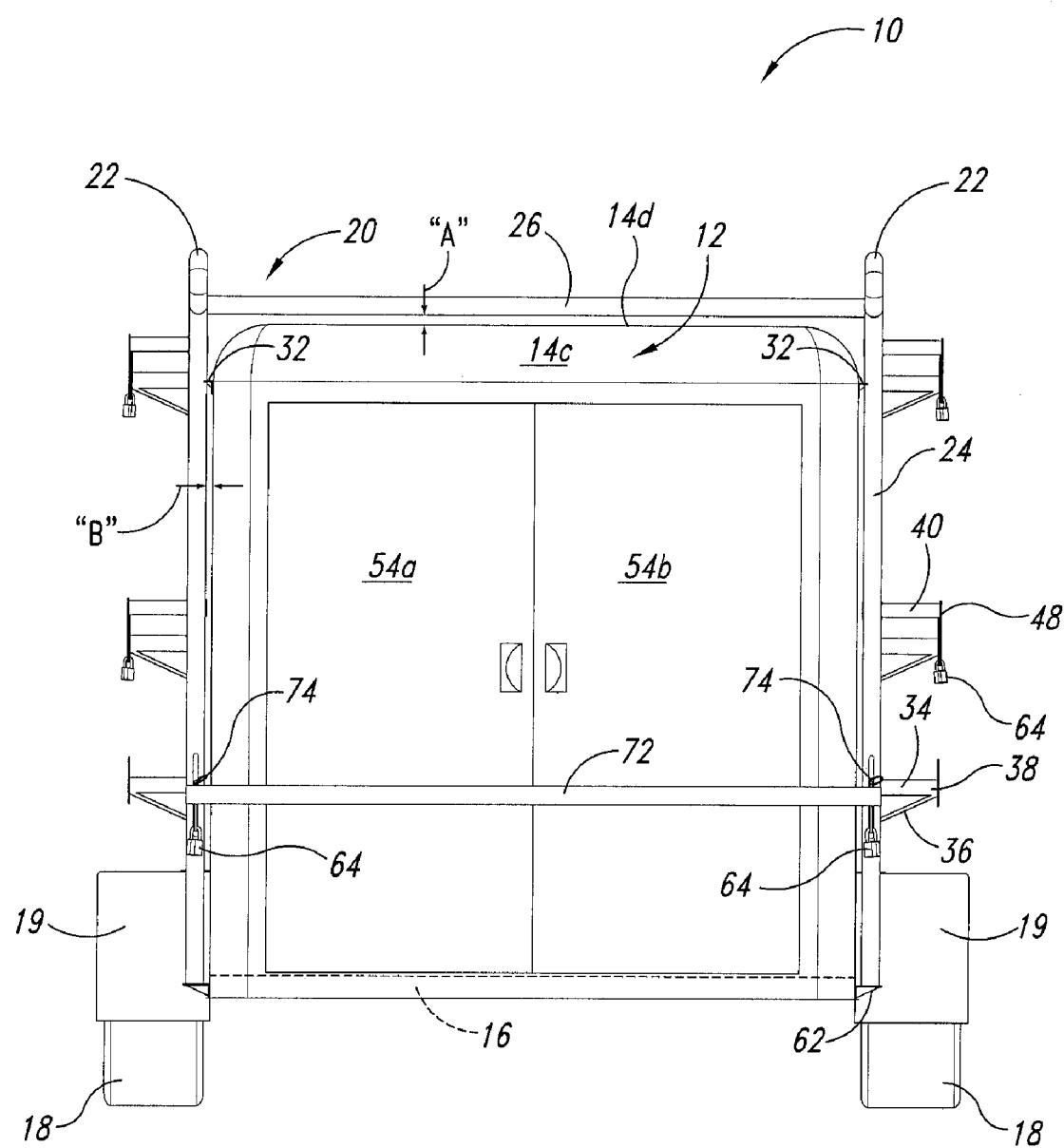
FIG. 3 is a rear elevation view of the inventive trailer rack as mounted on the box trailer of FIG. 1, and showing the transverse cross brace that prevents the rear doors being opened.

Considering FIGS. 1-3 as a related group, FIG. 1 is a perspective view from the left rear side of the inventive straddle-type trailer rack 10, mounted on a closed box trailer 12. FIG. 2 is a view from the right front side, and FIG. 3 is a rear elevation. In these figures, the trailer comprises a box body 14 mounted on a steel under-frame or chassis 16, and comprises front wall 14a (not shown in this view, see FIG. 2), two spaced side walls 14b, a rear wall 14c and a top 14d. The exemplary trailer 12 has a pair of rear doors and an optional side door (see FIG. 2). The chassis 16 is mounted on one or more axle/wheel assemblies 18, and may include an optional fender 19 over the wheel(s).

The inventive straddle-type trailer rack 10 comprises a load platform assembly 20 having a pair of opposed side rails 22, that are spaced apart by cross members 26. The platform 20 is supported by, in this example, six legs 24, three on each side, the tops of which are secured to the bottom member 22b of the side rail assembly 22. The distance between the bottom member 22b and the top member 22a of the side rail assembly 22 may be any suitable amount, and can be varied depending on the trade or use to which the rack is employed. Rings or hooks (not shown) may be welded or bolted to the side rail assembly as anchor points for lashings or tarps, as needed or desired.

The bottom of the legs are supported by frame brackets 28 that are bolted or welded to the under frame chassis 16. The bracket may include an optional gusset 62 where the load platform is designed to carry substantial weight. Where there is a fender, the leg bottom terminates in a foot 30 that sits on top the fender; underneath is the supporting bracket (best seen in FIG. 5). The leg is also spaced away from the side walls 14b by means of upper body spacer brackets 32. Note in this embodiment the middle legs are shorter than the forward and aft legs because of the presence of a fender. However, where there is no fender, the middle leg can extend down between the two tires and be bolted or welded directly to the frame there. Also, the fore-aft placement of the middle leg is selected to provide for even load balance. In a 2 wheel trailer, the middle leg may be over either of the axles on the fender as shown, or between the two axles. Generally, because of the weight of the frame and tongue, the proper placement is over the forward axle, or forward of the axle of a single wheel trailer.

The inventive straddle-type trailer rack also includes dual-function brackets 34, termed equipment brackets, that are supported by braces 36 and terminates in an up-standing lip plate 38. The brace permits the brackets 34 to be used as a step for the workman to access the top load platform 20. The brace 36 engages both the lip plate 38 and bracket tubing 34 at the outer end. Although the equipment bracket is shown as a piece of tubing, it may be flat steel plate welded either vertically or horizontally to the leg 24.

As shown, there are two or more step/equipment brackets per leg, aligned to permit horizontal loading of equipment, such as ladders 52. The ladders are securely retained on the brackets 34 by lip plate 38 and may be securely locked to prevent loss in transit or theft by keeper assembly 40. There can me more or less of the equipment brackets per leg to suit a particular tradesman's needs. For example, additional brackets may be provided to assist the workman climbing to the load platform, or for securing other equipment, such as hoses, and the like, or supplies (2×4s shown) 58.

By comparing FIGS. 1-3, note that the legs 24 are spaced away from the box body side wall 14b on the order of 1'-4" as identified by the Arrow B (FIG. 3), and the load platform 20 is spaced above the top 14d by from 2-6" as identified by Arrow A (FIG. 3). Note also by comparing those figures that the equipment, such as the ladders 52 are carried by the equipment brackets 34 within the wheel width of the axle/wheel assembly, so that the inventive straddle-type trailer rack 10 does not add width to the trailer.

As seen in FIG. 2 the legs are spaced so that they do not interfere with the opening of the side door 54. Optionally, a lock bar 90 may be provided to span between a middle leg and a forward leg. As shown the lock bar 90 is a tube, the aft end of which is welded to a sleeve 42 that pivotably rests on an annular plate 92 welded to the middle leg 24. The forward end of the bar terminates in a lock plate 48 having a hole or slot, 46a. The lock plate engages a plate 38 welded to the forward leg 24. The plate 38 includes a slot 46b. A padlock 64 is used to lock the plates 38/48 together to prevent the side door 54 from being opened. Optionally, instead of the lock bar 90, a pair of rings 94 may be welded to the legs, one on each of the middle and forward leg, and a chain (not shown) passed through the rings and the ends secured with a padlock.

Figure 6:
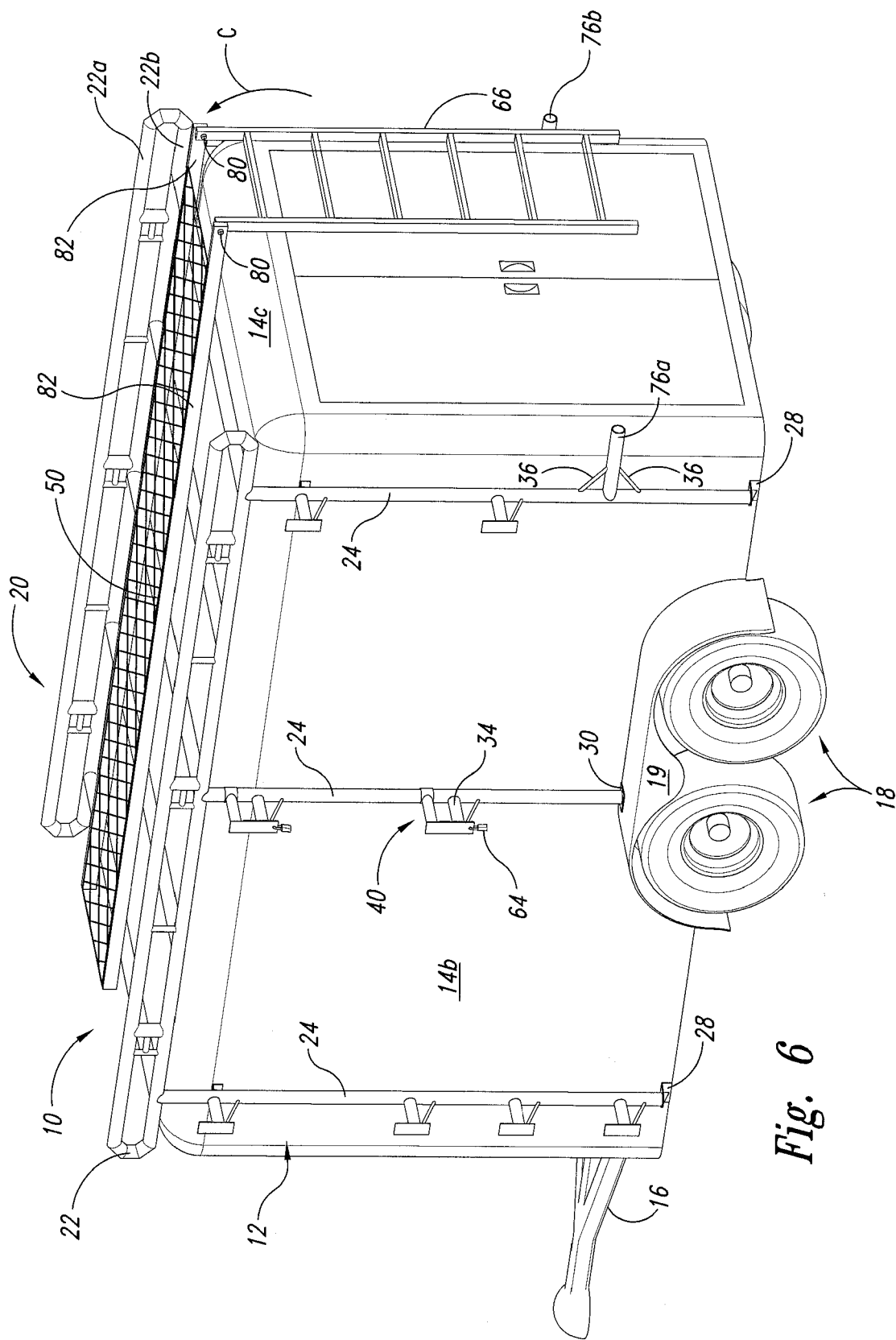
FIG. 6 is an isometric view as in FIG. 1 showing an optional catwalk and pivoting or retractable access ladder as mounted to the load platform of the inventive rack.

FIGS. 1, 3 and 6 also show an optional horizontal cross brace 72 provided to span across the back wall 14c (or/and the front wall 14a) of the trailer. This cross brace is spaced medially of the bottom and top ends of the legs 24 on the sides of the trailer, and has a dual function: first to provide a second layer of security to prevent opening of the rear doors, and second, as an access step for workman to access the load platform. The cross brace includes a pair of orthogonal extensions 73 adjacent the lateral ends of the brace 72 that are received in tubes 76a, 76b welded to the rear legs. The receiver tubes 76 may be supported by lower or/and upper diagonal braces 36. To retain the brace in place, aligned holes are provided in the receiver tubes and extensions, and a keeper pin 74 inserted. The keeper pin has a top head and preferably a hole near the bottom to receive a lock 64 to prevent the pin from being withdrawn. The lateral cross brace 72 is a safety, in the event a rear door springs open during bumpy travel. The cross brace 72 would prevent tools, materials and equipment from falling out and damaging following vehicles. In addition, it provides the additional function of a secondary lock at a jobsite, to prevent night-time or week-end theft. This is significant, as many workmen carry in excess of $10,000 worth of tradesman's tools and equipment in their trailers; loss means they are out of work.

FIG. 3 shows that the inventive rack 10 does not interfere with opening of the rear access doors. As shown the access doors 54a, 54b are vertically hinged and open left/right, respectively. However, the inventive trailer rack legs 24 are placed on the sides so that the doors fully open more than 180°. Likewise, the door can be a full fold down type, hinged along the bottom, so that the door in the open position (down) forms a ramp. This trailer configuration is frequently used for vehicle transport. Likewise, the horizontally hinged door can be split, half hinged at the top, and half at the bottom, or 40/60 top/bottom. The bottom portion (half or ⅔rds, for example) serves as a ramp, and the top portion serves as a sheltering overhang.

Figure 4:
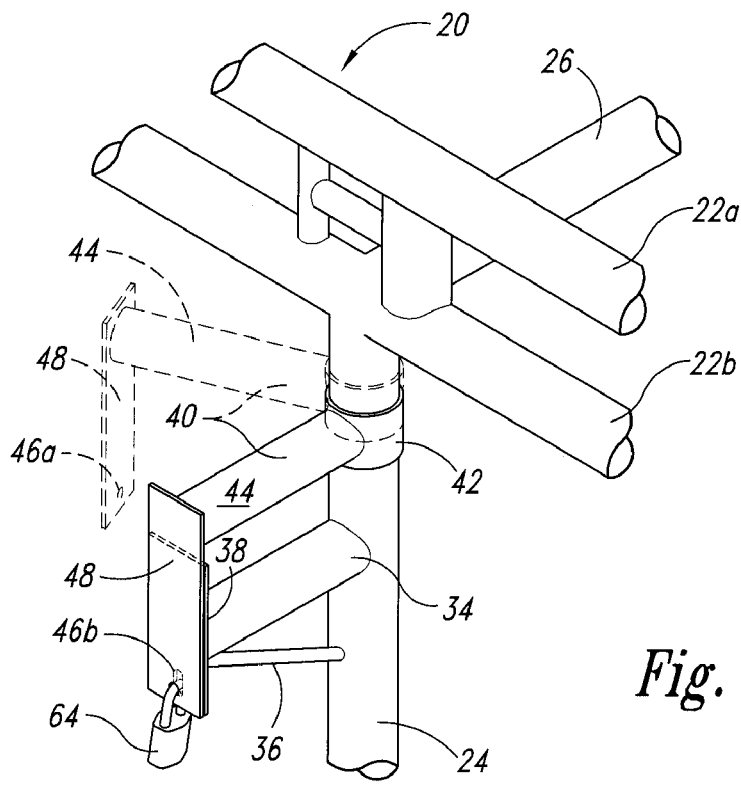
FIG. 4 is an isometric of the equipment/step bracket and its lockable keeper assembly in a first, open position in phantom, and in the second, locked position in solid lines.

FIG. 4 shows the function of the keeper assembly 40. The equipment bracket horizontal tube 34 is welded to the leg 24, is strengthened by diagonal brace rod 36, and terminates in an up-standing lip plate 38 having a lock slot 46b. The keeper assembly 40 includes a horizontal tube 44 welded to a sleeve 42, and it terminates at its outer end in a downward projecting lip plate 48 having a lock hole 46a. The length of tube 44 is enough longer than the tube 34 to permit the lip plate 48 to be dropped over lip plate 38, the hole and slot 46a, 46b aligned, and the keeper 40 locked to the equipment bracket with padlock 64. Note that an array of holes or holes and slots, or dual slots can be provided in the lip plate 36 and keeper plate 48 to accommodate various widths of ladder rails, equipment or materials locked in place. In addition, the keeper plate and lip plate can be longer to provide more carrying capacity.

Figure 5:
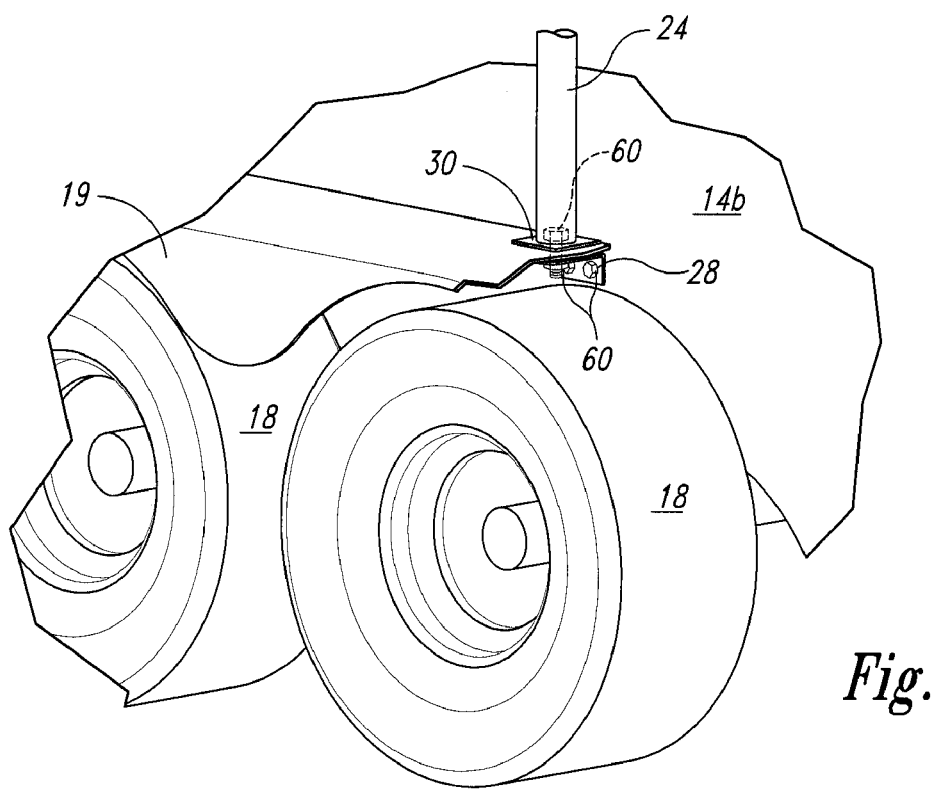
FIG. 5 is an enlarged isometric of the wheels and fender assembly of the trailer of FIG. 1 with a portion of the fender broken away to show the leg, foot and support bracket arrangement for fender mounting of a center leg of the inventive rack assembly.

FIG. 5 shows the middle leg 24 terminating at its bottom end in a foot plate 30 that rests on top of the fender 19. A vertical bolt 60 is welded into a central hole of the footplate 30. The bolt projects through a hole in the fender, and thence through a frame bracket 28 and a lock nut secures the bracket to the bolt. The bracket is also bolted to the frame with horizontal bolts 60 as shown, As noted above the frame brackets may include reinforcing gussets, 62 (see FIG. 1).

FIG. 6 shows the inventive rack mounted on a trailer frame as in FIG. 1 with the cross brace removed to more clearly show the receiver tubes 76a and 76b. In addition, this figure shows an optional catwalk 50 mounted on the load platform assembly 20. That catwalk can be bolted to the top of the load platform as an after-market option.

In addition, an optional access ladder 66 is shown. The ladder may be secured to the fore or aft ends of the catwalk rails 82 via pivots 80, so that the ladder can fold up and over to a stowed position as shown by Arrow C. Optionally, and preferably, the ladder may fold up horizontally, and then slide under the catwalk in the space A (see FIG. 3). Where the ladder 66 is secured to the front end of the catwalk, it is preferred to be permanently secured to the catwalk, and have rubber or polymeric bumpers spacing it from the front end wall 14a (FIG. 1). The ladder may also be secured to or hung from a cross member 26, and may be an add-on accessory, formed as a separate structure that is bolted or pinned to the cross members (e.g., for the kit version of the inventive rack), or may be integral to the load platform, welded to the cross members. For a rear or side-mounted ladder, the bottom of the ladder may extend closer to, or include sliding legs that permit it to extend all the way to the ground, or/and be slanted, as desired. Optionally, the bottom ends of the ladder side rails may be curved toward the door and terminate in rubber bumpers to prevent the ladder from banging into and damaging the door.

Figure 7:
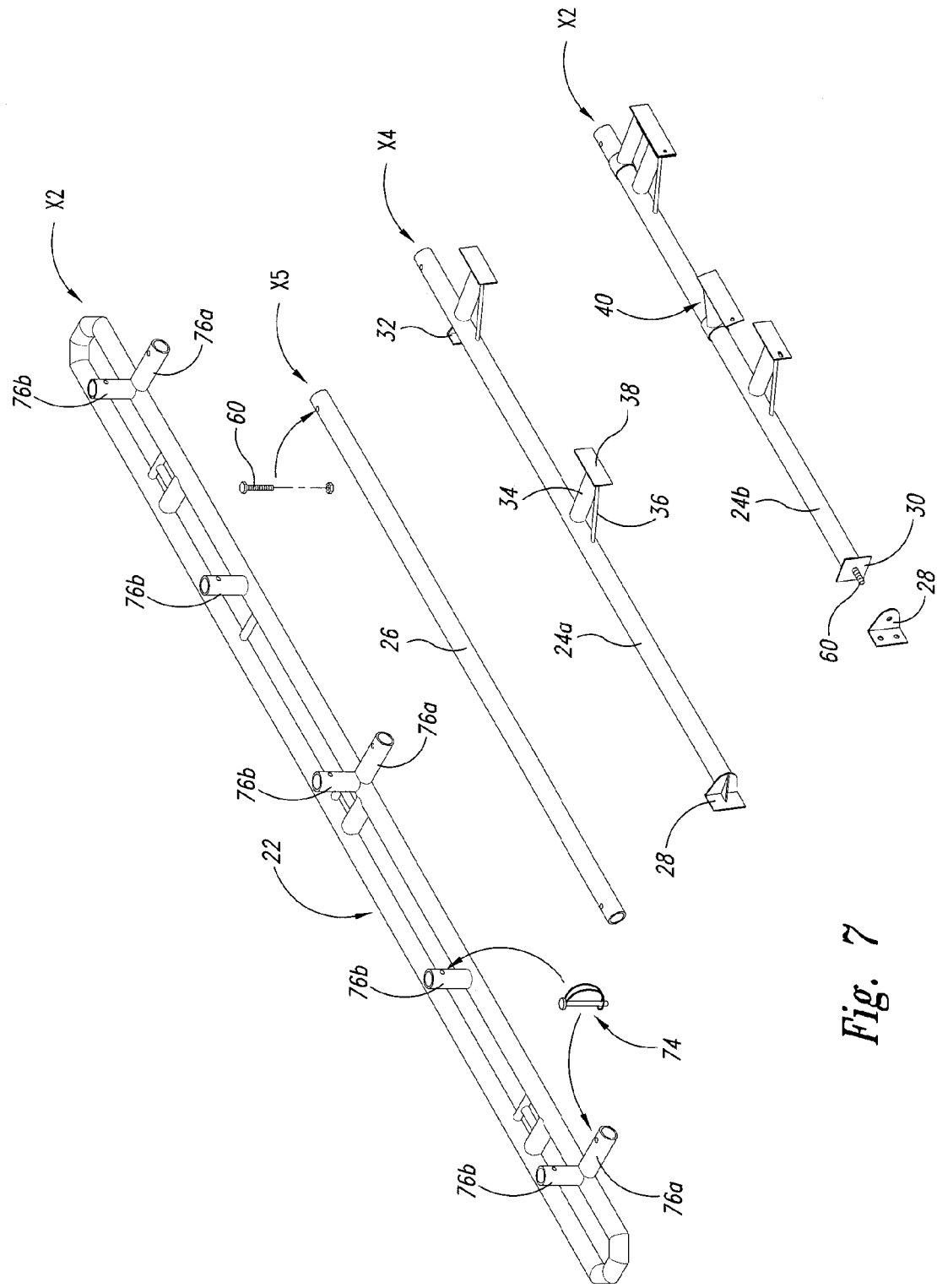
FIG. 7 is an isometric view of the parts of the inventive rack in a kit form.
Figure 9:
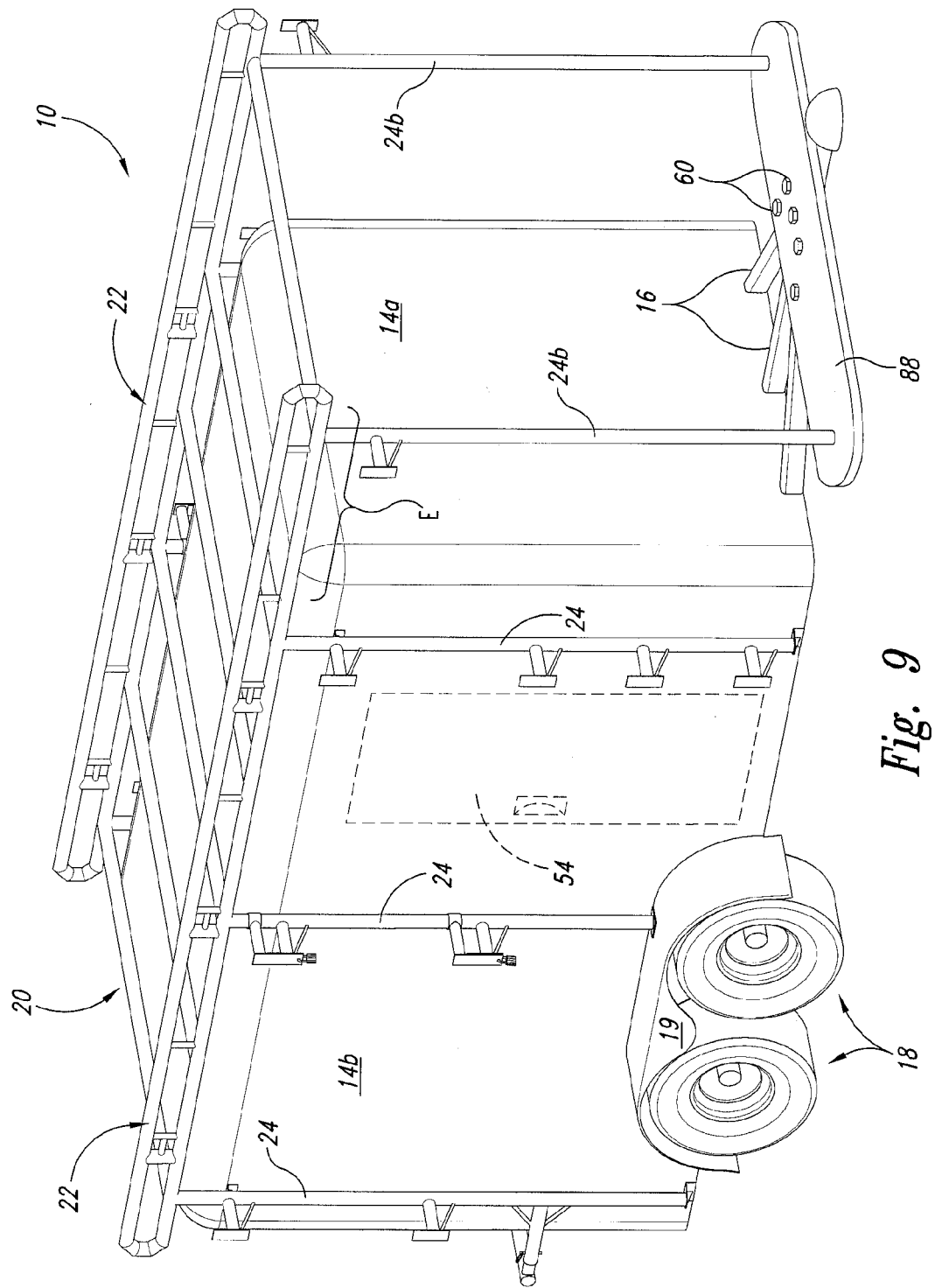
FIG. 9 is an isometric view from the front right showing the inventive trailer rack having a forward extension for the load platform supported on the trailer frame just aft of the hitch.

FIG. 7 shows the inventive rack in a kit form, in which two side rail assemblies 22 are provided. Note the orthogonal sleeves 76a, 76b. As shown, in this kit example, the frame brackets 28, the equipment brackets 34 and the keeper assembly 40 are pre-assembled on the corner legs 24b. The foot plate 30 is preassembled on the shorter middle legs 24a, but the under fender brackets 28 are provided separately. The body spacer brackets 32 are preassembled on the legs. Bolts as needed, of various sizes are provided, along with assembly and mounting instructions. This kit can be shipped by freight, UPS, FedEx Ground, or other transport direct to the customer. Various accessories, such as the cross braces of FIGS. 1 and 3, the ladder and catwalk of FIG. 6 and the forward extension of FIG. 9 are optional items that can also be shipped, whether with the kit or the dealer installation, or later.

The sleeves 76a receive the legs 24a, 24b, and the sleeves 76b receive the cross braces 26, of which from 3-6 are provided, 5 being shown in this example. Four corner legs 24a are shown as including a pre-welded bracket 28. Two middle legs 24b with the lockable keeper assembly 40 are provided. The footplate 30 is provided as pre-welded onto the bottom of the middle legs 24b, and the separate bracket 28 is provided. The cross braces 26 are fitted into the receiving sleeves 76b and the pins 74 are fitted into the aligned holes and the semi-circular keeper spring snapped over the projecting bottom end of the pins. Alternately, bolts 60 may be used to secure all parts together. The length of the side rail assemblies, the number of legs and cross members may be varied depending on the length of the trailer to which secured, shorter/fewer for short trailers, and longer/more for long trailers.

To assemble the kit, the corner legs are fitted into the appropriate sleeves 76a, and the two sides raised up vertically, and the cross members inserted in sleeves 76b and pinned together. The unit is then walked over the trailer, the middle legs inserted, and the brackets bolted to the frame. Alternately, the legs can be bolted first to the frame, one side rail placed on the legs, cross members inserted, and the second side rail attached. Bolts are presently preferred over pins to reduce flexure and provide needed rigidity in the entire rack assembly.

Figure 8:
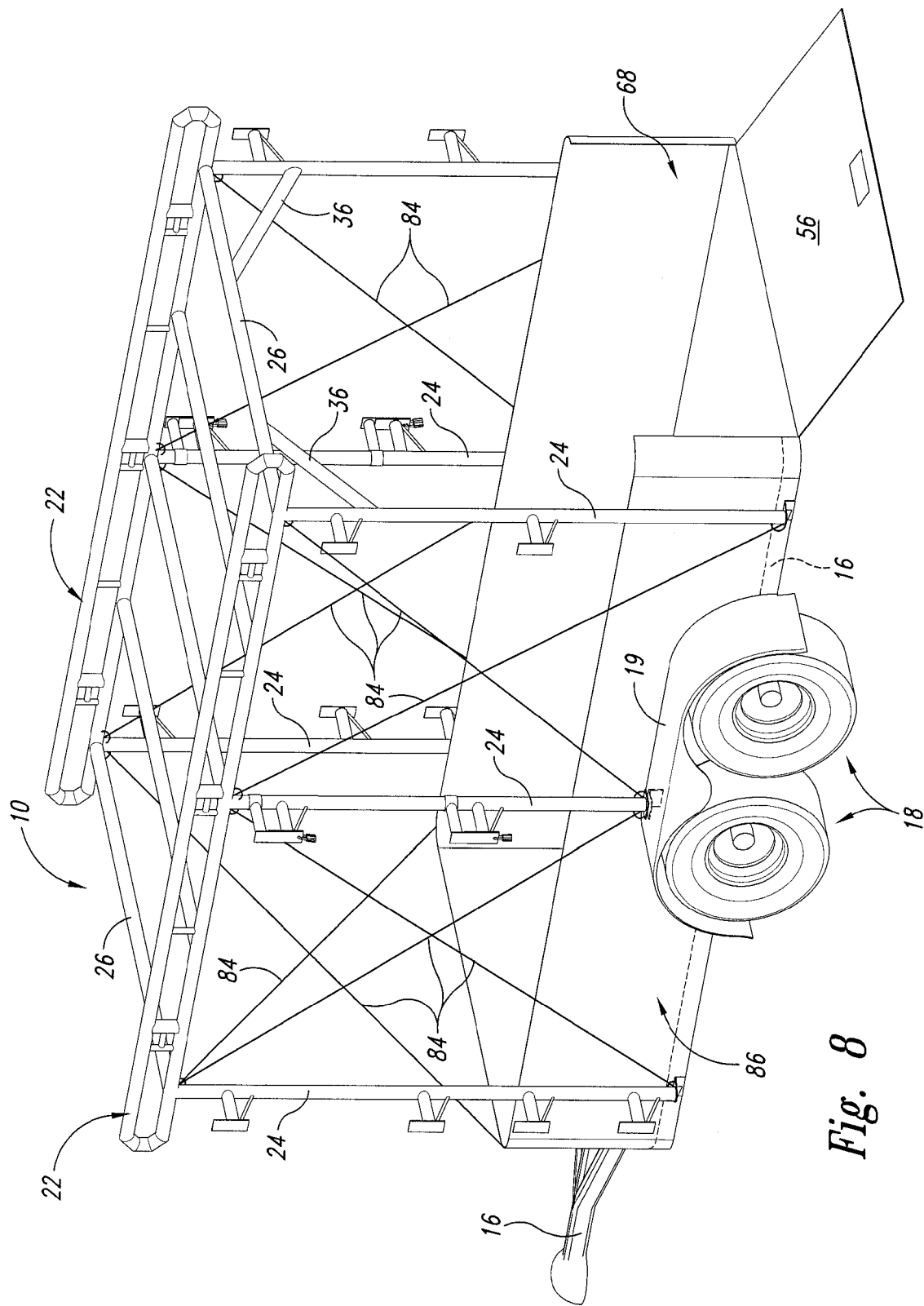
FIG. 8 is an isometric view from the left rear of one embodiment of an open trailer having a rear access ramp as fitted with a straddle-type rack of the present invention.

FIG. 8 shows an open trailer 86 having a partial load or bin box 68 and a rear ramp 56 fitted with the straddle-type rack 10 of the present invention, mounted as with the closed trailer of FIGS. 1-7 to the frame 16 and fender 19 via brackets 28. In addition, cross braces of tubing or tensioned cables 84 may be applied to the front and sides of the open framework of the rack, as shown. Added diagonal bracing 36 between the rear legs and the cross member may be used at the rear or/and front or and mid-leg position. Note that in this configuration, a tarp, canvas or rip-stop, water-proof tent fabric can be secured to the inventive trailer rack with bungees or rope, thus providing some weather protection, e.g. for gardening equipment including tractors, weed whackers, blowers, trimmers, edgers and implements, or for household goods being moved, such as furniture, bedding and the like. Optionally, hooks can be provided on the frame rails, cross members, legs and reinforcing braces to engage grommets on the tarps or tenting material, or from which to hang plywood, chipboard or OSB sheets.

FIG. 9 is an isometric drawing showing a forward extensions E of the rack side rails 22 forward of the front wall of the trailer 14a. The forward end is supported by a pair of legs 24a, 24b that rest on a support plate 88 that is bolted to the converging frame members 16 just aft of the hitch as shown. This permits carrying longer supplies and equipment on the load platform 20. As shown, such equipment or materials can extend over the bed or/and cab of a towing pick-up truck without interfering with operation, turning, going over bumps or the like.

INDUSTRIAL APPLICABILITY

It is clear that the inventive trailer straddle-type trailer rack has wide applicability to trailers of all types, and particularly to job-site and vehicle transport covered trailers. It should be under-stood that various modifications within the scope of this invention can be made by one of ordinary skill in the art without departing from the spirit thereof and without undue experimentation.

APPENDIX

This Parts List is provided as an aid to Examination and may be canceled upon allowance.

| | |
|---|---|
| 10 Inventive Straddle-type trailer Rack | 48 Keeper lock plate |
| 12 Trailer | 50 Optional catwalk |
| 14 Box Body: | 52 Ladder |
| 14a Front wall; 14b side wall; | 54 Door |
| 14c Rear side wall; 14d top | 56 Ramp |
| 16 Steel underframe chassis | 58 Supplies (lumber) |
| 18 Axle/Wheel Assembly | 60a, 60b, 60c Bolts |
| 19 Fender | 62 Gusset |
| 20 Load Platform Assembly | 64 Padlock |
| 22 Side rails. 22a, lower tube; | 66 Optional fold-down or |
| 22b, upper tube | retracting side ladder |
| 24 Legs | 68 Bin Box |
| 26 Cross members of load platform | 70 |
| 28 Frame brackets to support legs | 72 End wall cross brace, |
| 30 Leg foot | front or/and rear |
| 32 Body Spacer Bracket | 73 Orthogonal extension |
| 34 Equipment Bracket dual purpose, | of cross brace |
| step also | 74 Pins |
| 36 Brace | 76a, 76b Receiver tube for cross |
| 38 Lip plate | brace, member or leg. |
| 40 Keeper Assembly | 80 Pivot assembly |
| 42 Keeper sleeve | 82 Extension of catwalk ends |
| 44 Keeper arm | 84 Cross braces (tubing or cable) |
| 46a, 46b Aligned lock holes | 86 Open trailer |
| Clearances: A. Top; B Side; D Front. | 88 Support plate for extension |
| E - Forward Extension | legs |
| C Pivoting ladder path of rotation | 90 Lock bar or chain |
| | 92 annular support plate |
| | 94 Rings for chain |

The invention claimed is:

1. A trailer-mounted equipment rack, said trailer having an under-frame and at least one axle having wheels mounted thereon, the spacing of said wheels defining a track width of said trailer, said trailer being selected from an open top and a closed load box for carrying things, comprising elements as assembled together forming in operative combination:
   a. a generally horizontal rack load platform mounted on a trailer, said trailer having sidewalls, an under-frame and at least one axle having wheels mounted thereon, the spacing of said wheels defining a track width of said trailer, said trailer being selected from an open top and a closed load box for carrying things, said rack load platform having a longitudinal axis oriented parallel to a central longitudinal axis of said trailer, a lateral width that is within the track width of said trailer, upstanding first and second, spaced, vertical side rail members, and cross braces spanning between a lower edge of said vertical side rail members;
   b. a plurality of leg members, disposed secured to and spaced along each of said side rail members and disposed vertically to extend downwardly from the top end of said legs toward the trailer under-frame;
   c. a mounting bracket secured to the bottom of each of said legs mounting said legs directly to said under frame of said trailer; and
   d. said equipment rack mounted on said trailer effectively straddling, and spaced outwardly from the side walls and top, if any, of the trailer load box, said rack load platform, legs and mounting brackets permitting said rack to carry substantial loads of equipment and materials without bearing on said trailer load box side or top walls.

2. An equipment rack as in claim 1 which includes an object support bracket mounted on at least one leg on at least one side of said rack medially between said leg bottom and said leg top, which bracket includes a horizontal retaining member and a vertical keeper member at an outer end of said bracket.

3. An equipment rack as in claim 2 wherein at least some of said legs to which a bracket is mounted includes a vertically adjustable security assembly comprising a horizontal member and a downwardly extending keeper member, the length of said horizontal member permitting said keeper of said security assembly to co-operatingly engage said keeper of said object support bracket so that objects do not jump off said object support bracket in transit.

4. An equipment rack as in claim 1 wherein said load platform framework and said legs are formed of tubular stock.

5. An equipment rack as in claim 1 which includes a forward leg, a rear leg and at least one middle leg per side.

6. An equipment rack as in claim 5 wherein said middle leg includes a foot at the bottom, said leg is selected to be of a length to permit said foot to rest on the top of a fender covering said wheel, a bracket is secured to said trailer frame just below where said leg foot rests on said fender, and said foot and bracket are secured together through said fender.

7. An equipment rack as in claim 1 wherein said load platform includes a catwalk disposed medially of said side rails.

8. An equipment rack as in claim 1 which includes a ladder assembly that is engagable to a cross-member or one of said side rails of said load platform and orientable to hang down from said load platform so that a user can mount the ladder to place or arrange objects on said load platform.

9. An equipment rack as in claim 8 wherein said ladder assembly is selected from an assembly secured to said load platform in a non-movable manner, and an assembly that is selected from pivotable, slidable or both pivotable and slidable with respect to said load platform to move it out of the way when not in use.

10. An equipment rack as in claim 1 wherein at least one spacer member is provided adjacent a top end of at least one of said legs to engage a side or top wall of an enclosed box-type trailer to assist in stabilizing said box during transit.

11. An equipment rack as in claim 1 wherein a cross-plate is provided to be secured to the trailer frame forward of the trailer load box and behind the hitch, a pair of vertical legs are provided secured to and extending upwardly from said cross-plate, and said load platform is extended forward of said trailer load box to engage said legs, said extension permitting loading lengths of objects longer than said trailer load box onto said load platform.

12. An equipment rack as in claim 1 which includes at least one horizontal cross brace with fittings to span between spaced front end side legs or rear end side legs medially of the tops and bottoms of said side legs to provide additional lateral structural rigidity when in place.

13. An equipment rack as in claim 12 wherein at least the rear horizontal cross brace is removably mountable to fittings on said rear side legs to prevent opening of a rear door when in place.

14. An equipment rack as in claim 12 wherein the at least one horizontal cross brace is a front horizontal cross brace substantially permanently mounted to said front side legs.

15. An equipment rack as in claim 1 wherein said trailer is an enclosed trailer which includes a door on at least one side, said legs of said rack on the door side of the trailer are disposed spaced to permit said door to open.

16. An equipment rack as in claim 15 wherein said rack includes a removably mountable horizontal bar spanning between legs disposed on either side of said side door so that said bar may be locked in place to prevent said door from being opened.

17. An equipment rack as in claim 1 wherein said enumerated elements are provided in un-assembled form as a kit for user assembly into said equipment rack and mounting on said trailer.

18. An equipment rack for trailers having an under-frame and at least one axle having wheels mounted thereon, the spacing of said wheels defining a track width of said trailer, said trailer being selected from an open top and a closed load box for carrying things, comprising elements as assembled together forming in operative combination:
   a. a generally horizontal rack load platform for trailers having an under-frame and at least one axle having wheels mounted thereon, the spacing of said wheels defining a track width of said trailer, said trailer being selected from an open top and a closed load box for carrying things, said rack load platform having a longitudinal axis oriented parallel to a central longitudinal axis of said trailer, a lateral width that is within the track width of said trailer, upstanding first and second, spaced, vertical side rail members, and cross braces spanning between a lower edge of said vertical side rail members;
   b. a plurality of leg members, disposed secured to and spaced along each of said side rail members and disposed vertically to extend downwardly from the top end of said legs toward the trailer under-frame;
   c. a mounting bracket secured to the bottom of each of said legs to permit mounting said legs directly to said under frame of said trailer;
   d. said equipment rack as mounted on said trailer effectively straddling, and spaced outwardly from the side walls and top, if any, of the trailer load box, said rack load platform, legs and mounting brackets permitting said rack to carry substantial loads of equipment and materials without bearing on said trailer load box side or top walls;
   e. said equipment rack includes an object support bracket mounted on at least one leg on at least one side of said rack medially between said leg bottom and said leg top, which bracket includes a horizontal retaining member and a vertical keeper member at an outer end of said bracket; and
   f. wherein at least some of said legs to which a bracket is mounted includes a vertically adjustable security assembly comprising a horizontal member and a downwardly extending keeper member, the length of said horizontal member permitting said keeper of said security assembly to co-operatingly engage said keeper of said object support bracket so that objects do not jump off said object support bracket in transit.

19. An equipment rack as in claim 18 wherein said keepers are fitted with a slot and a hole respectively, oriented so that a lock shackle may be passed there-through to lock them together.

20. An equipment rack for trailers having an under-frame and at least one axle having wheels mounted thereon, the spacing of said wheels defining a track width of said trailer, said trailer being selected from an open top and a closed load box for carrying things, comprising elements as assembled together forming in operative combination:
   a. a generally horizontal rack load platform for trailers having an under-frame and at least one axle having wheels mounted thereon, the spacing of said wheels defining a track width of said trailer, said trailer being selected from an open top and a closed load box for carrying things, said rack load platform having a longitudinal axis oriented parallel to a central longitudinal axis of said trailer, a lateral width that is within the track width of said trailer, upstanding first and second, spaced, vertical side rail members, and cross braces spanning between a lower edge of said vertical side rail members;
   b. a plurality of leg members, disposed secured to and spaced along each of said side rail members and disposed vertically to extend downwardly from the top end of said legs toward the trailer under-frame;
   c. a mounting bracket secured to the bottom of each of said legs to permit mounting said legs directly to said under frame of said trailer;
   d. said equipment rack as mounted on said trailer effectively straddling, and spaced outwardly from the side walls and top, if any, of the trailer load box, said rack load platform, legs and mounting brackets permitting said rack to carry substantial loads of equipment and materials without bearing on said trailer load box side or top walls;
   e. said equipment rack includes a forward leg, a rear leg and at least one middle leg per side; and
   f. wherein said middle leg includes a foot at the bottom, said leg is selected to be of a length to permit said foot to rest on the top of a fender covering said wheel, a bracket is secured to said trailer frame just below where said leg foot rests on said fender, and said foot and bracket are secured together through said fender.

* * * * *